Aug. 23, 1955    P. STEINACKER    2,715,994
COUNTERCURRENT EXTRACTION CENTRIFUGES
Filed Nov. 22, 1949    4 Sheets-Sheet 1
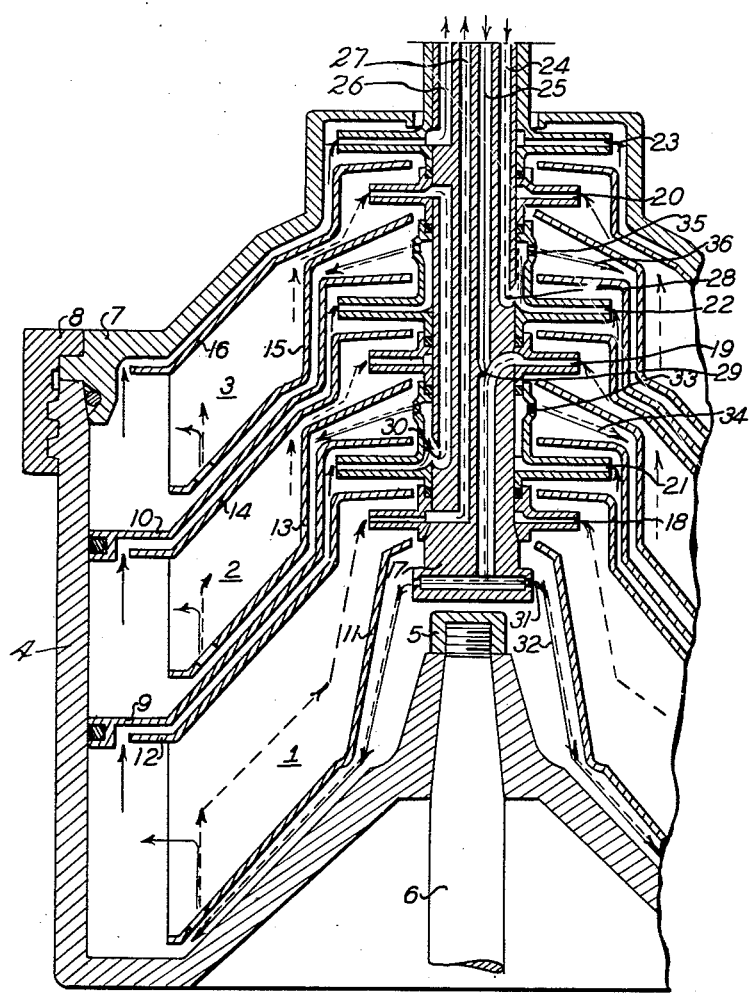
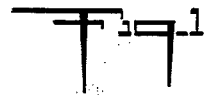
INVENTOR
PETER STEINACKER
BY *Ralph D. Dwiklage*
ATTORNEY Aug. 23, 1955   P. STEINACKER   2,715,994
COUNTERCURRENT EXTRACTION CENTRIFUGES
Filed Nov. 22, 1949   4 Sheets-Sheet 4

Inventor:
Peter Steinacker
by Ralph Dulslag
attorney

United States Patent Office 2,715,994
Patented Aug. 23, 1955

2,715,994

COUNTERCURRENT EXTRACTION CENTRIFUGES

Peter Steinacker, Oelde, Westphalia, Germany

Application November 22, 1949, Serial No. 128,770
In Germany October 6, 1948

Public Law 619, August 23, 1954
Patent expires October 6, 1968

9 Claims. (Cl. 233—15)

The present invention relates to centrifugal drums for a continuous treatment of liquids on the countercurrent principle and is a continuation-in-part of U. S. patent application Serial No. 121,098, filed October 13, 1949 and now abandoned. One object of the invention is to provide a centrifugal drum which is so constructed that the best possible separation of the liquids passing through it is ensured. Another object of the invention is to considerably reduce the sizes of the centrifugal drum so as to facilitate the assembling of its parts.

When separating raw products and groups of substances into their individual constituents chemical industries make a difference between the processes of distillation, crystallization and the extraction of the solvent. The solvent extraction is characterized by two liquid currents made to counterflow each other and thus brought into close contact with a view to making a third substance soluble in either liquid pass from the one to the other liquid. If it is therefore intended to extract from the liquid to be dealt with a substance dissolved in it, by means of solving agents, the second liquid used as an extraction agent should be to the least possible extent soluble in the former liquid, and should be easily separable by the formation of layers. In consequence, the specific weight of the second liquid should be different from that of the former liquid to be treated.

In order, for instance, to extract phenol from water containing it there is used a solving agent very little soluble in water, e. g. butyl acetate. The substance to be extracted, i. e. the phenol, however must be more soluble in the extraction agent, i. e. in the butyl acetate than in water if the desired effect is to be attained. The stronger those properties of the solvent, the quicker and the more effective is the extraction, which means that the less solvent is to be used; and the time of the close contact between the liquids may be shorter.

As one of the methods of extracting the solvent, there is known the extraction by stages. In the case of this method each stage consists of a mixer and a separator. The stages are connected (one after another) in such a way that, on the whole, the extracting agent and the raw material are counterflowing to each other. The solvent, therefore, should preferably enter the apparatus at that end where the liquid freed from the extracted substance is discharged. The solvent flows countercurrent to the liquid to be treated so that it absorbs more and more extraction matter from stage to stage.

The matter of arranging alternatively and in series single centrifugal separators and mixing pumps when applying the said principle is also known. Another improvement is achieved by the multiple-stage extraction centrifuges, each stage forming a centrifugal drum in itself in which the liquids mixed with each other before or when entering the drum are again separated and discharged. The discharging devices may be so arranged that the separated liquids pass immediately to the next centrifugal stage, but they may as well as be brought to the next stage through heating, cooling and mixing apparatuses.

Often it is necessary for either liquid to be as pure as possible on leaving the centrifugal drum. In other cases one liquid may contain a small quantity of the other. In order to obtain pure liquids the separating effect in the centrifugal drum must be very great, and this effect can be attained by either using a centrifugal drum of correspondingly large dimensions or by providing the drum with an especially effective drum insertion, e. g. inserted plate packages with a large number of separating plates.

Now, I have found that the extractive effect to be obtained by the counter current treatment is almost not, or only to a little extent influenced upon if in the individual stages the separation does not take place in a sharp or rigid manner, so that the said individual stages can be essentially smaller or can be provided with simple insertions, e. g. wing-insertions or vanes, or insertions comprising only a few plates, without considering the liquids to be as pure as possible when leaving the centrifugal drum.

The present invention consists of the first and last stages (or only the first or the last stage) of a counter current extraction drum being so formed that the desired complete separation of the liquids is attained in them, whereas an incomplete separation only is achieved in the intermediate stages. To this end, in the case of the present invention, the first and the last stages (or the first or the last stage) of the centrifugal drum are of larger sizes than the intermediate stages, or they are provided with highly efficient insertions, e. g. insertion plates or disc means. In accordance with the invention it is also possible to take the two aforementioned measures at the same time.

Owing to the two aforementioned measures the sizes of the centrifuge, with consistent efficiency, are considerably reduced, the construction is simplified and the assembling facilitated.

Figure 1 shows a vertical section partially in elevation through a centrifugal drum constructed in accordance with the invention.

Figure 2:
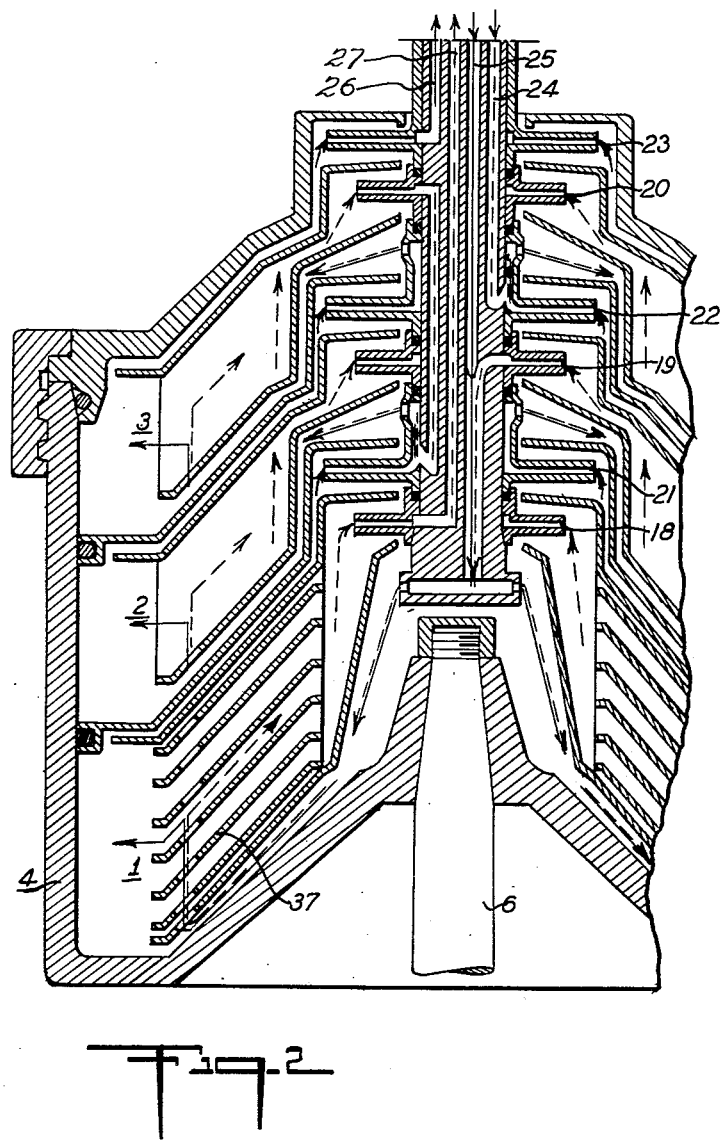
Fig. 2 is a vertical section through a similar centrifugal drum, one of the separating chambers being provided with insertion plates.

According to Fig. 1, the centrifugal subdivided is into three stages or separating chambers 1, 2 and 3. The outer drum consists of the drum pot 4, which is screwed to the driving spindle 6 by means of the nut 5 and is covered by a lid 7, which is screwed together with the drum pot 4 by means of the threaded ring 8. The partitions 9 and 10 divide the interior drum space into the separating chambers 1, 2 and 3. Each of these separating chambers operates like a centrifugal drum by itself. The cubic content of the separating chamber 1 is much larger than that of the two other separating chambers, and it contains the distributor 11 and the separating plate 12. The separating chamber 2 contains the distributor 13 and the separating plate 14, and the separating chamber 3 contains the distributor 15 and the separating plate 16. The non-rotating shaft 17 supports three stripping disks 18, 19, 20 for the discharge of the liquids of a lighter specific weight and another three stripping disks 21, 22 and 23 for the discharge of the liquid of a larger specific weight. Moreover the shaft 17 is provided with the channels 24, 25, 26 and 27 to take in and discharge the liquids; that is to say the channel 24 serves the inlet and the channel 27 the discharge of the liquid of a smaller specific weight. The channel 25 serves the inlet and the channel 26 the discharge of the liquid of a larger specific weight. In view of the fact that the entering points 28, 29 and 30 are formed to operate like injectors, the two liquids are caused to mix themselves at these points.

To give an example for the operation of the described centrifugal drum the extraction of phenol from water is described as follows: The passage of the water containing phenol (being the specifically heavier liquid) is given in Figure 1 by continuous lines, and the passage of the extraction agent butyl acetate (being the specifically lighter liquid) is shown by dotted lines. The direction of the current is marked by arrows.

When the centrifuge is in operation the water containing phenol flows through the channel 25 into the centrifuge, and mixes at point 29 with the butyl acetate coming out of the centrifugal stage 2. The resulting mixture flows through the openings 31 to the distributor space 32 to reach from there the separating chamber 1, where it is separated. As a result of the large cubic content of chamber 1, the mixture is exposed there for a longer time to the centrifugal force than it is in the separating chambers 2 and 3, whereby the mixture is better separated into water and butyl acetate. The butyl acetate with a more concentrated content of phenol is attacked by the stripping disk 18 and discharged from the drum through the channel 27. The water which has given up a portion of the phenol flows from between the wall 9 and the separating plate 12 towards the shaft of the drum and the stripping disk 21. The latter conveys the water to the mixing point 30, where it mixes with the butyl acetate coming out of the separating chamber 3. Owing to the operation of the stripping disk 21, the mixture is pressed on through the openings 33 to the distributing chamber 34. From here it gets to the separating chamber 2, where it is separated again. By means of the stripping disk 19 the butyl acetate passes to the mixing point 19, whereas the water, whose phenol content has again been reduced, flows from between the wall 10 and the separating plate 14 to the stripping disk 22. The stripping disk 22 directs the water to the mixing point 28 where it mixes with the fresh butyl acetate flowing in through the channel 24. By means of the stripping disk 22 the mixture is pressed through the openings 35 to reach the distributing chamber 36. From here the mixture gets to the separating chamber 3, where it is separated again. The fresh butyl acetate absorbs the remaining phenol from the water already dealth with twice, and flows to the stripping disk 20, which directs the butyl acetate to the mixing point 30. The water made free from phenol (dephenolized) flows from between the drum lid 7 and the separating plate 16 towards the drum shaft, the stripping disk 23 discharging it from the drum through the channel 26.

Figure 3:
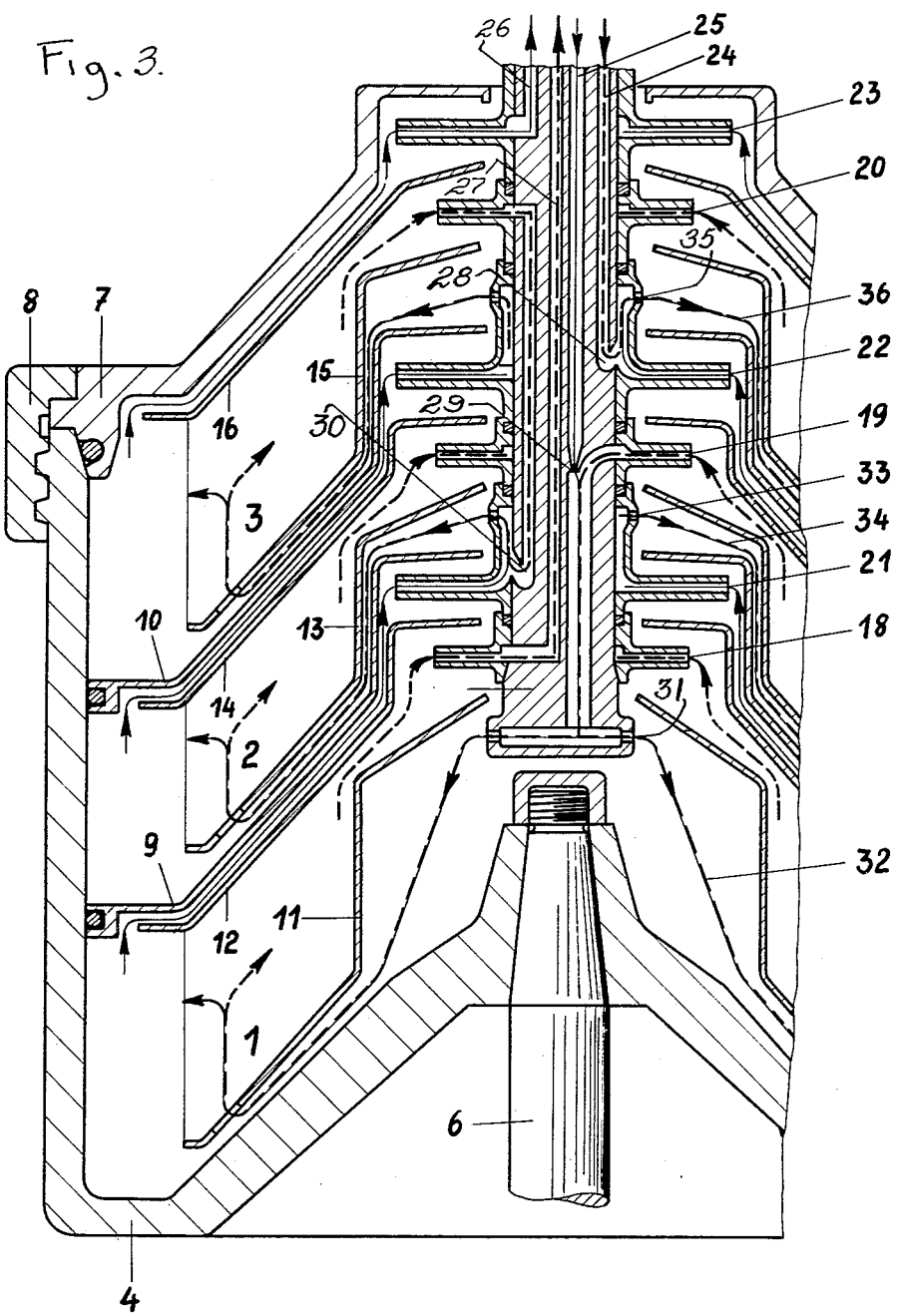
Fig. 3 is a vertical section through a centrifugal drum in accordance with the invention having the first and last separating chamber of greater cubic content than the intermediate separating chamber.

Construction and operation of the embodiment as shown in Fig. 3 is identical with that described above with reference to Fig. 1 except that both the first and last separating chamber are of greater cubic content than the intermediate chamber.

Figure 4:
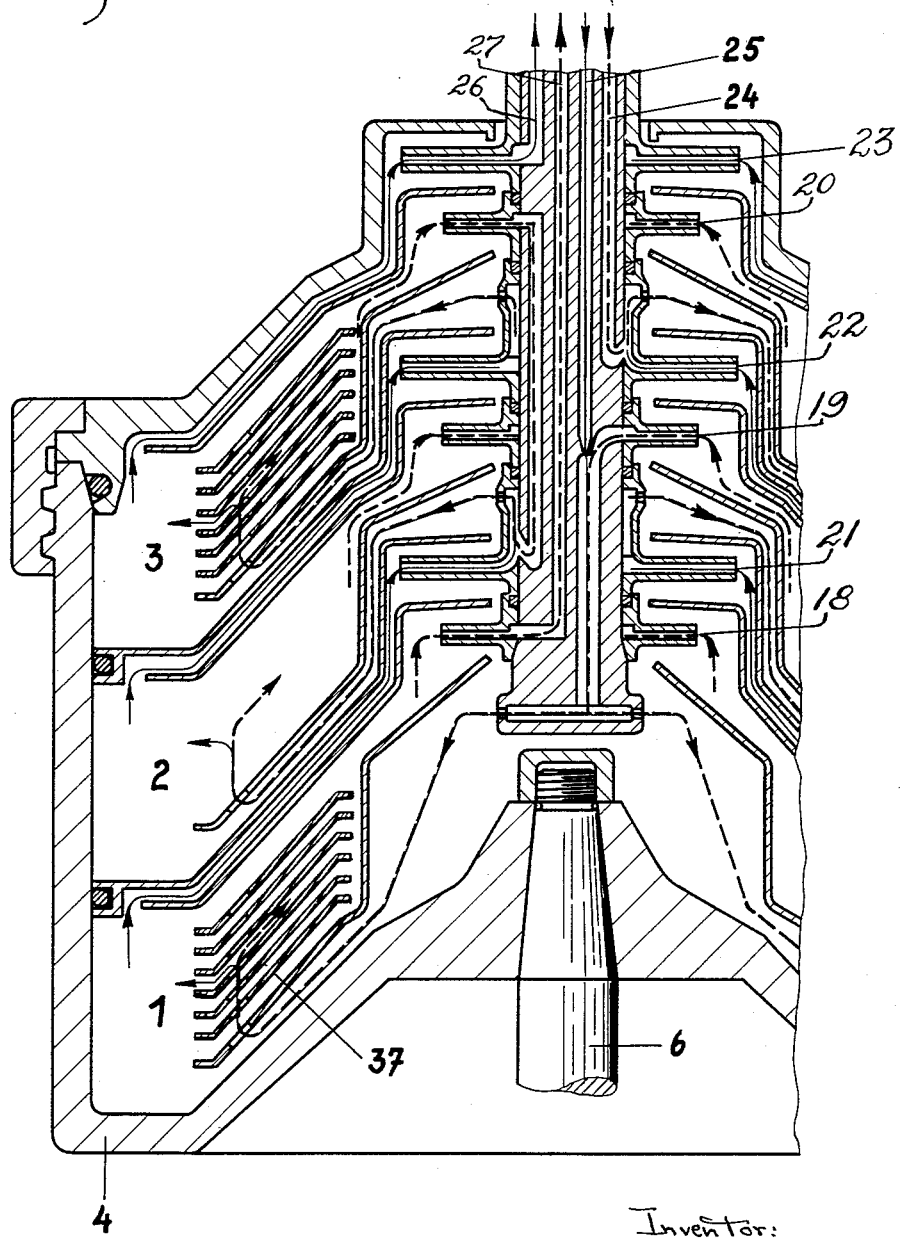
Fig. 4 is a vertical section through a centrifugal drum in accordance with the invention having insert plates or discs means in the first and last separating chamber.

In the case of the centrifugal drum according to Figure 2, the arrangement of the separating chambers is the same as that of Figure 1, with the only exception that the lower separating chamber 1 is provided with insertion plates 37 further increasing the separating efficiency of that chamber. In the embodiment as shown in Fig. 4 insertion plates or disc means are provided in the first and last separating chambers 1 and 3 while the intermediate separating chamber 2 is free of these disc means.

In the case of the centrifugal drums according to the two given examples of carrying out the invention, the specifically lighter liquid leaves the centrifugal drum as pure as possible. For this reason it is only the first stage (or the separating chamber 1) that has the larger content of liquid and the insertion plates respectively.

Said centrifugal drum is advantageously used when water containing phenol shall be freed from it. The water thus cleared always contains a small percentage of extraction agent dissolved in it and should in any case be subjected to distillation in order to regain the extraction agent. For this reason, there is no objection to some non-dissolved extraction agent being discharged from the drum together with the water made free from phenol. The extraction agent coming out of the first centrifugal stage, however, must not contain water as this would involve difficulties when the phenol is to be obtained from the extraction agent. It is therefore necessary for the first stage to separate the substance especially well.

On the other hand other methods of applying the present invention require an especially efficient separation by the last stage; for instance, reference is made to the production of acetic acid from waste water resulting from the distillation of wood. By adding acetic acid to the specifically lighter extraction agent the specific weight of the latter is increased, whereas the specific weight of the waste water is somewhat reduced. The separation, however, is dependent on the difference between the specific weights of the liquids and thus is most difficult in the last stage. Under the present invention, in this case the efficiency of the last stage is enhanced by increasing its cubic content or by fitting in insertion plates.

It is also possible to provide more than three stages in one centrifugal drum. Moreover it is possible to arrange in series several multiple-stage centrifugal drums. In this case both the first and the last stages may be given an especially high separating power by increasing their cubic contents or by fitting in a highly efficient insertion, e. g. insertion plates or disc means. At last it is possible to operate a centrifuge with a multiple-stage drum in combination with a special centrifuge with a single drum of a large cubic content or with large insertion plates.

As may be seen from the above, the invention essentially resides in an improvement in a multi-stage counter-current centrifuge. The centrifuge has the centrifugal bowl divided by partition means, such as the partitions 9 and 10, into at least three centrifugal stages, i. e. the stages 1, 2, and 3, consecutively positioned along the axis of rotation of the bowl. Means, such as the conduit and inlets 25, 31, and 32, are provided for admitting one of two liquids of differing specific gravity into the first stage, and means, i. e. the conduit and inlets 24, 35, and 36, are provided for admitting the other liquid to the last stage. The liquids then pass countercurrent to each other to each stage for passage through all the stages entering each stage as a mixture and leaving each stage in centrifugally separated fractions.

In accordance with the improvement, the centrifuge is provided with means defining discharge inlets in the lower outer portion of each of the stages, i. e. the openings through outer lower edges of the distributors 11, 13, and 15. Means defining separated fraction outlets for the specifically lighter and specifically heavier fractions are provided in the upper inner portion of each stage. The means defining the separated fraction outlets for the specifically lighter liquids are the discs 18, 19, and 20 and the means defining separated fraction outlets for the specifically heavier fractions are, for example, the discs 21, 22, and 23. Conduit means, such as the conduit 25, is provided for passing a liquid fraction into the centrifuge to the discharge inlet of the first stage and conduit means, as for example conduit 24, is provided for passing a liquid fraction into the centrifuge to the discharge inlet of the first stage. A discharge conduit, such as conduit 26, is connected to one of the separated fraction outlets in the last stage and discharge means, such as conduit 27, is connected to the other separated fraction outlets in the first stage. Conduit means, such as the conduit connecting the disc 20 and the outlet opening 33 and the conduit connecting the disc 19 and the outlet opening 31, connect one of the separated fraction outlets in each stage to the discharge inlet of the next preceding stage. Conduit means, such as the conduits connecting the disc 21 to the outlet opening 33 and the conduit connecting the disc 22 to the outlet opening 35, connect the other of the separated fraction outlets in each stage to a discharge inlet of the next subsequent stage. Means define within each stage a passage for liquid travel between the inlets and outlets therein, i. e. the passages for liquid travel between the distributors and separating plates in each stage. The passage defined within the first and/or the last stage is of greater cubic content than the passage in the intermediate stage or stages and/or contains disc means, i. e. the discs 37.

What I claim is:

1. In a multiple-stage countercurrent centrifuge of the type having within one centrifugal bowl partition means defining at least three centrifugal stages consecutively positioned along the axis of rotation of the bowl, including a last, at least one intermediate, and one first stage, and providing means for admitting one of two liquids of different specific gravities to said first stage and the other to said last stage, and means for passing such liquids countercurrent to each other to each said stage for passage through all said stages, entering each stage as a mixture and leaving each stage in centrifugally separated fractions, the improvement which comprises means defining discharge inlets in the lower outer portion of each of said stages, means defining separated fraction outlets for specifically lighter and specifically heavier fractions in the upper, inner portion of each of said stages, conduit means for passing a liquid fraction into said centrifuge to said discharge inlet of said first stage, conduit means for passing a liquid fraction into said centrifuge to said discharge inlet of said last stage, a discharge conduit connected to one of said separated fraction outlets in said last stage, discharge means connected to the other separated fraction outlet in said first stage, conduit means connecting one of said separated fraction outlets in each stage to said discharge inlet of the next preceding stage, conduit means connecting the other of said separated fraction outlets in each stage to the discharge inlet of the next subsequent stage, means defining within each of said first, intermediate, and last stages, a passage for liquid travel between said inlet and said outlets therein, the passage defined within at least one of said first and last stages being of greater cubic content than the passage in said intermediate stage.

2. Improvement according to claim 1, in which the stage having defined therein the passage for liquid travel of greater cubic content has disc means positioned therein.

3. Improvement according to claim 1, in which both said first and said last stages have a passage for liquid travel defined therein of greater cubic content than said passage of said intermediate stage.

4. Improvement according to claim 1, in which said first stage has a passage for liquid travel between said inlet and said outlets defined therein of greater cubic content than said passages in said last and intermediate stages.

5. Improvement according to claim 1, in which said last stage has a passage for liquid travel between said inlet and said outlets defined therein of greater cubic content than said passage in said intermediate stage.

6. In a multiple-stage countercurrent centrifuge of the type having within one centrifugal bowl partition means defining at least three centrifugal stages consecutively positioned along the axis of rotation of the bowl, including at least one last, one intermediate, and one first stage, and providing means for admitting one of two liquids of different specific gravities to said first stage and the other to said last stage, and means for passing such liquids countercurrent to each other to each said stage for passage through all said stages, entering each stage as a mixture and leaving each stage in centrifugally separated fractions, the improvement which comprises means defining discharge inlets in the lower outer portion of each of said stages, means defining separated fraction outlets for specifically lighter and specifically heavier fractions in the upper, inner portion of each of said stages, conduit means for passing a liquid fraction into said centrifuge to said discharge inlet of said first stage, conduit means for passing a liquid fraction into said centrifuge to said discharge inlet of said last stage, a discharge conduit connected to one of said separated fraction outlets in said last stage, discharge means connected to the other separated fraction outlet in said first stage, conduit means connecting one of said separated fraction outlets in each stage to said discharge inlet of the next preceding stage, conduit means connecting the other of said separated fraction outlets in each stage to the discharge inlet of the next subsequent stage, means defining within each of said first, intermediate and last stages a passage for liquid travel between said inlet and said outlets therein, and disc means positioned in the passage defined in at least one of said first and last stages dividing said passage into a multiple number of flow channels.

7. Improvement according to claim 6, in which said disc means are positioned in the passages for liquid travel defined in both first and last stages.

8. Improvement according to claim 6, in which said disc means are positioned in said passage defined in said first stage.

9. Improvement according to claim 6, in which said disc means are positioned in said passage defined in said last stage.

References Cited in the file of this patent

UNITED STATES PATENTS

| | | |
|---|---|---|
| 2,036,924 | Coutor | Apr. 7, 1936 |
| 2,176,982 | Thayer | Oct. 24, 1939 |
| 2,261,724 | Holm | Nov. 4, 1941 |
| 2,291,849 | Tomlinson | Aug. 4, 1942 |
| 2,313,541 | Flowers | Mar. 9, 1943 |